(12) United States Patent
Klaben

(10) Patent No.: US 9,582,785 B2
(45) Date of Patent: Feb. 28, 2017

(54) MINDMAP ILLUSTRATOR

(76) Inventor: Gary W. Klaben, Glenview, IL (US)

( * ) Notice: Subject to any disclaimer, the term of this patent is extended or adjusted under 35 U.S.C. 154(b) by 275 days.

(21) Appl. No.: 12/950,885

(22) Filed: Nov. 19, 2010

(65) Prior Publication Data

US 2011/0167329 A1 Jul. 7, 2011

Related U.S. Application Data

(60) Provisional application No. 61/272,935, filed on Nov. 20, 2009.

(51) Int. Cl.
*G06F 17/00* (2006.01)
*G06Q 10/10* (2012.01)
*G06F 17/30* (2006.01)

(52) U.S. Cl.
CPC ....... *G06Q 10/10* (2013.01); *G06F 17/30126* (2013.01)

(58) Field of Classification Search
CPC .............................................. G06F 17/30126
USPC .................................. 715/206; 707/102, 769
See application file for complete search history.

(56) References Cited

U.S. PATENT DOCUMENTS

| | | | |
|---|---|---|---|
| 6,292,792 B1* | 9/2001 | Baffes et al. | 706/45 |
| 7,496,860 B2* | 2/2009 | Saxena et al. | 715/853 |
| 7,702,679 B2* | 4/2010 | Barber et al. | 707/736 |
| 8,103,703 B1* | 1/2012 | Jetter et al. | 707/805 |
| 8,161,396 B2* | 4/2012 | Barber et al. | 715/751 |
| 8,316,371 B2* | 11/2012 | Chaffee et al. | 718/103 |
| 8,392,267 B1* | 3/2013 | Mendelson et al. | 705/26.1 |
| 8,583,470 B1* | 11/2013 | Fine et al. | 705/7.31 |
| 8,606,618 B2* | 12/2013 | Dabke | 705/7.29 |
| 9,038,001 B2* | 5/2015 | Jetter et al. | 715/853 |
| 2004/0093343 A1* | 5/2004 | Lucas et al. | 707/102 |
| 2004/0196312 A1* | 10/2004 | Powers et al. | 345/753 |
| 2006/0020629 A1* | 1/2006 | Ramani et al. | 707/104.1 |
| 2008/0077609 A1* | 3/2008 | Ronen | 707/102 |
| 2008/0140666 A1* | 6/2008 | D'Alton Harrison | 707/9 |
| 2008/0141126 A1* | 6/2008 | Johnson et al. | 715/273 |
| 2008/0208885 A1* | 8/2008 | Barber et al. | 707/102 |

* cited by examiner

*Primary Examiner* — Mohammed-Ibrahim Zuberi
(74) *Attorney, Agent, or Firm* — McGinn IP Law Group, PLLC

(57) ABSTRACT

A method of generating a linked client master mind map. Client actions and documents are linked to a client master mind map to generate a linked client master mind map. The linked client master mind map and a client relationship management program are reviewed and packaged.

19 Claims, 21 Drawing Sheets

200

400

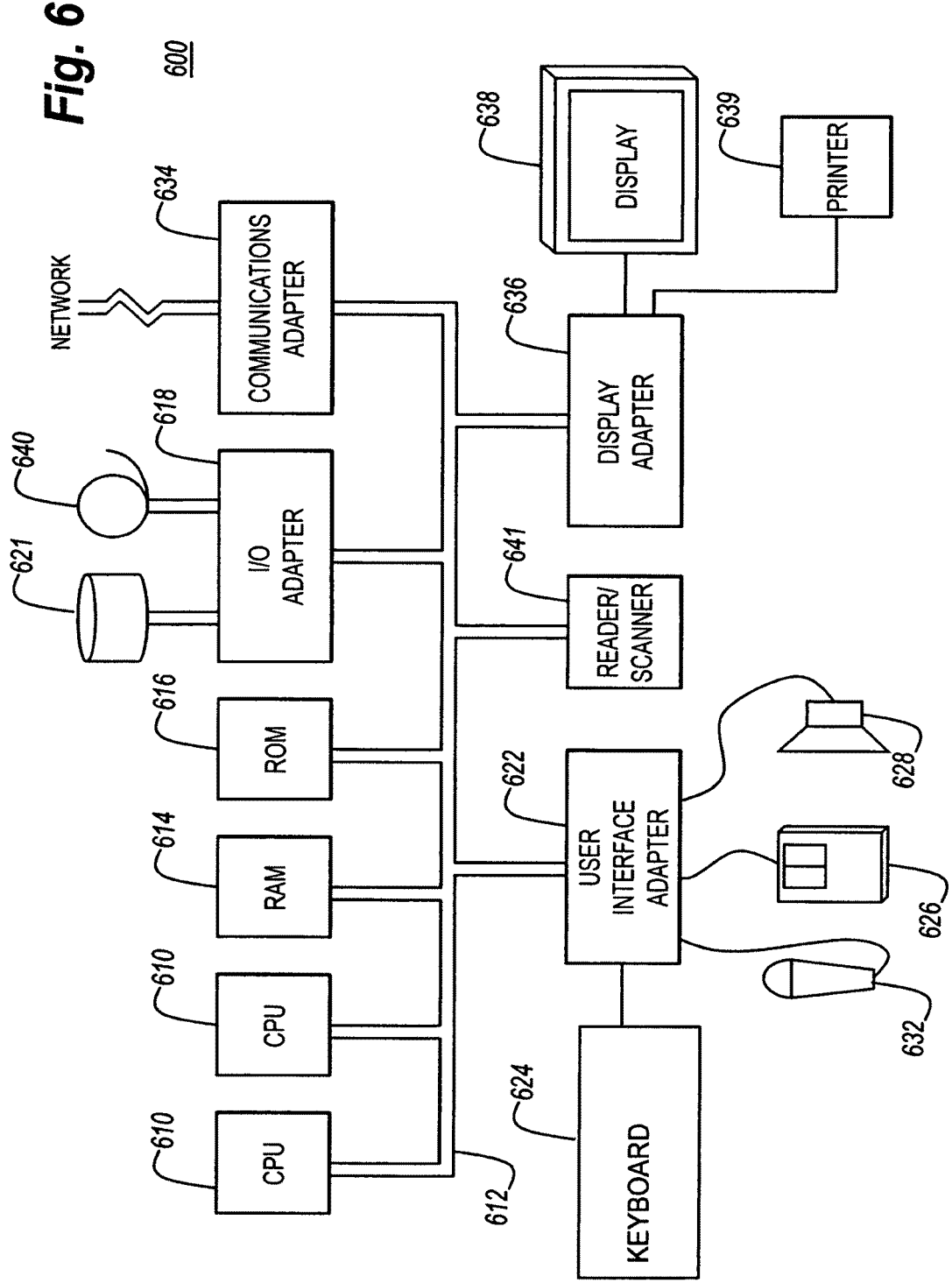

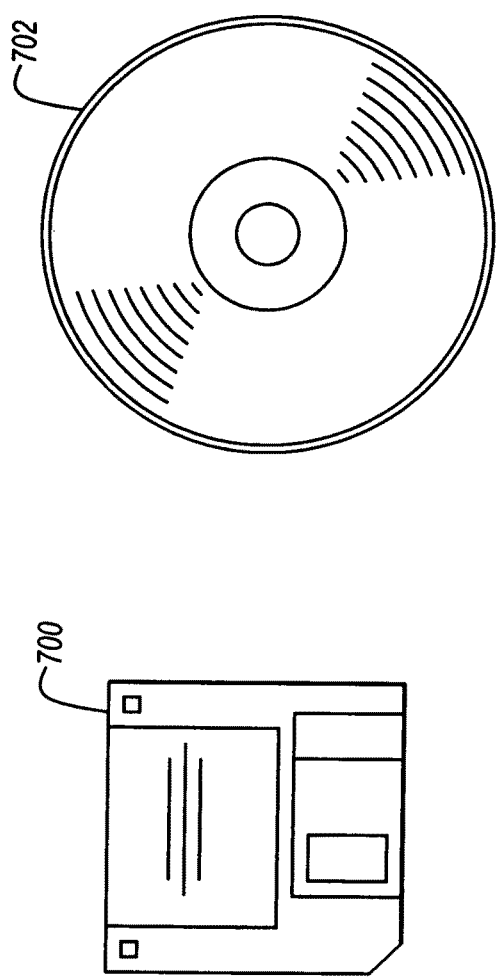

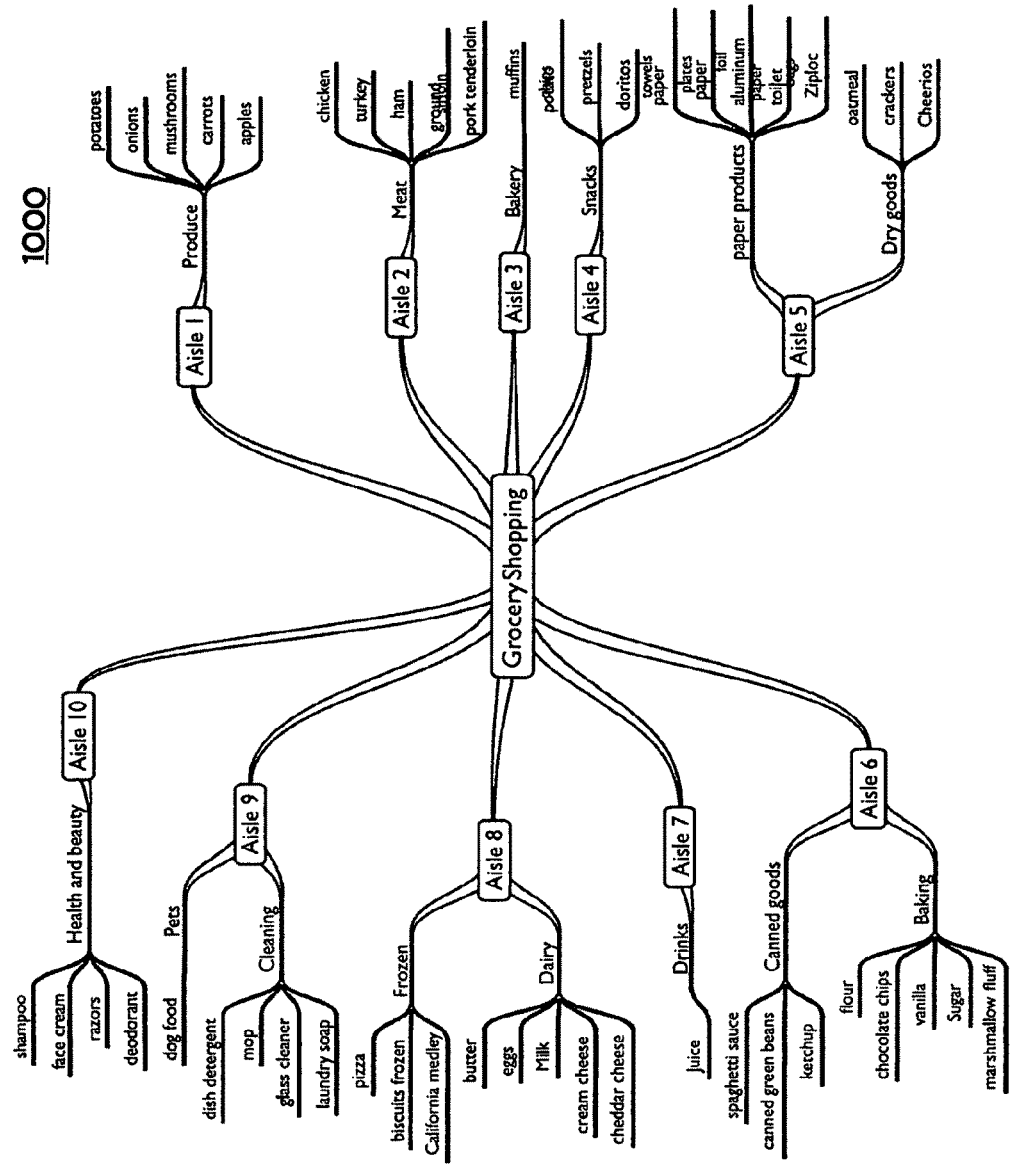

2000

2100

MINDMAP ILLUSTRATOR

CROSS-REFERENCE TO RELATED APPLICATION

The present application is a Non-Provisional application of and claims benefit to Provisional U.S. Patent Application Ser. No. 61/272,935 filed on Nov. 20, 2009.

BACKGROUND OF THE INVENTION

Field of the Invention

The present invention generally relates to a method and apparatus for creating a process around front facing use of "mind maps" for communication to clients and customers.

Description of the Related Art

A connected set of lists organized by similar categories is conventionally referred to as a "mind map." Whereas a list is linear, a mind map is connected horizontally rather than vertically (in linear fashion). As the brain is divided into two halves, the left for logical, step-by-step linear analytical processes, and the right for the big picture and creative thought, one thinks both vertically and horizontally. One uses both sides of the brain.

Mind maps are thinking tools that reflect externally what goes on inside a person's head. Mind maps allow people to make associations result in connections; connections that feed to memory and to thinking. The brain is radiant. That is, it thinks centrally (holistically) and explodes (radiates) out in all directions.

Step One—Mind Download

FIG. 8 illustrates a conventional method 800 of creating a client master mind map which may include five steps. Referring to FIG. 8, in an exemplary first step, Step 810, one would perform a mind download, also referred to as a "mind burst" or a "mind dump." A first technique would be to take a piece of paper and spend ten minutes writing down all the major open items being worked on for the client. Typically, after ten minutes, 80% of everything related to the client will have been written down. If there are client relationship management (CRM) program activities or other information, then it is usually best to slowly perform this very important initial process.

Typically, retrieving information from a person's brain requires use of different parts of the brain: the big picture (more of the right side) and individual activities (more of the left side). Many find it difficult to do both seamlessly. Certainly, if a person were to type directly into a word processing file or e-mail, then the typing function may be automatic. But moving around a mind map program requires more brain attention. It is preferable that a team member other than the advisor builds and updates the mind maps.

Step Two—1st Revision & Reconstruction

Next, in Step 820, the list created in Step One is now entered into the client master mind map. This may be done by opening up the client master mind map template with the 15-branch titles, entering each item on the list under the appropriate branch, and placing the items that are difficult to enter under the "To Be Sorted" branch.

Next, the mind map should be printed out and an advisor should go through and make corrections, and enter the corrections by revising and reconstruction. Reconstruction is the process by which an item is moved from one branch to another.

Step Three—Incubation

Next, in Step 830, the mind map is put aside for one to three days. After the waiting period, the mind map is printed out for a second revision and reconstruction. By such "incubating," new connections may have been discovered or remembered after allowing a few days of incubation.

Step Four—2nd Revision/Reconstruction

In Step 840, changes are made to the client master mind map. The changes may then be entered into the program, and then the client master mind map is printed out for a final review.

Step Five—Decide/Conclude

In Step 850, it is exemplarily determined if the client master mind map is complete and accurate, and the branches and items are reviewed for presentation to the client.

To illustrate a conventional method of creating a mind map, assume that a customer that has never entered a grocery store and is not familiar with the layout, but nevertheless can identify all the products contained within the store.

In this example, FIG. 9 illustrates a list of items to be purchased in the grocery store by the customer. The order of the items on the grocery list is not related to other items on the list or how these items are arranged in the grocery store. However, all items will be found in the grocery store.

At the grocery store, without proper organization, one unfamiliar with the grocery store would walk in the front door, grab a cart, and continue into the store. If a first item on the list is milk, the visitor to the store would look for the dairy aisle, and go to the dairy aisle. At the dairy aisle, the customer would get the milk and move on to the next item on the list.

The next item on the list is Cheerios®. The customer may recall passing Aisle 5 and that the cereal is located on that aisle. The customer would then proceed to Aisle 5 for the Cheerios®. The next item on the list is eggs, so the customer would return to the dairy aisle.

Since the customer is unfamiliar with the layout, there will be a lot of repeated trips down the same aisles. Of course, most people do not behave this way at store. But, in terms of more complicated areas of life, such as financial services the grocery store story may be an apt analogy for the conduct of conventional businesses.

Of course, a far better way to grocery-shop would be to organize items on the list exactly as the grocery store is laid out. In this case, the items on the list may be connected to each aisle in list format, as illustrated in FIG. 10. That is, FIG. 10 illustrates an exemplary mind map for a customer's use.

A variety of behavioral theories have been postulated about how people behave in different settings. One thing people are sure of is that one's behavior changes over time. These changes are both intentional and unintentional. One purposefully changes one's habits, attitudes and outlook, which results in a different way of operating. People also are affected by outside forces as well as by health, jobs, family and a variety of other factors. One such behavioral theory is the Transtheoretical Model of Behavior. The Transtheoretical Model of Behavior 1100 is broken down into five steps as illustrated in FIG. 11: a precontemplation step 1112 followed by a contemplation step 1120, a preparation step 1130, an action step 1140, and, finally, a maintenance step 1150.

Precontemplation happens when various thoughts and ideas arise in a person's head. There is no action; just musings and wonderings.

The second step is Contemplation. In Contemplation, a person may be considering offering a new service or purchasing a new program. Many ideas and thoughts might be eliminated at this time, while a few will make it through to the third step, Preparation. During the Preparation stage, information is gathered, research is completed, and consideration takes place on how to integrate the new product or service into an existing business and team. At some point during this period, the moment of truth arrives. A "go" or "no go" decision is made. To "go" means to take action, the fourth step. The implementation of delivering the new product or service takes place. Finally, after Action is taken, this new behavior needs to be Maintained, the fifth step.

It is important to note that at any point during the five steps, one may move backwards or forwards. One's complex world, one's limited time and one's confusing business landscape do not allow many pre-contemplated ideas to survive, be fleshed out, acted upon and then maintained as part of one's already established business behaviors.

The present inventor has recognized that conventional methods of dealing with clients and customers have a number of problems including the conventional back-facing, opaque use of mind maps. The present invention overcomes the conventional difficulties by creating a "front-facing" use of mind maps for clients and customers.

SUMMARY OF THE INVENTION

In view of the foregoing, and other, exemplary problems, drawbacks, and disadvantages of the conventional systems, it is an exemplary feature of the present invention to provide a method of generating a linked client master mind map. Client actions and documents are linked to a client master mind map to generate a linked client master mind map. The linked client master mind map and a client relationship management program are reviewed and packaged.

The inventor discovered that a problem with using conventional mind maps (e.g., as illustrated in FIG. 9) is that there are no computer tools available for front-face use for clients and customers. So, even if mind maps are used for client transactions, they are not linked to a client's actions and documents. Furthermore, mind maps have conventionally been back-facing for organizations and not front-facing for clients and customers. That is, back-facing uses are not prepared for clients or other persons outside an organization to implement or peruse. Thus, there has conventionally been no use of mind maps for clients and customers (i.e., mind maps specifically prepared for a client's use and for preparing with meeting the client or customer). That is, FIG. 10 could exemplarily illustrate a front-facing mind map if it were created by a store that is front loaded for a customer's use, instead of a back-facing mind map for use only by the store.

The present invention provides an exemplary method of linking client actions and documents to a client master mind map to simplify a complex client business environment.

In addition, the present invention may help prevent businesses from performing unpaid shadow work for their clients. That is, work can be properly billed to the client as it is performed.

Previously, company staffs and advisors did the best they could to help prepare, for example, for a financial review involving a client. However, their clients' complex lives were so integrated into the technical and structural aspects of their estates that the advisor invariably was the only one who could put it all together. Exemplarily, in the method of the present invention, the first thing a team member will do is review a client master mind map. What previously took 30 minutes could now take five minutes. The client master mind map review centers the team on the current structure of the client's estate and its relationship to individual actions/activities.

BRIEF DESCRIPTION OF THE DRAWINGS

The foregoing and other purposes, aspects and advantages will be better understood from the following detailed description of an exemplary embodiment of the invention with reference to the drawings, in which:

FIG. 6 illustrates a typical hardware configuration which may be used for implementing the computer system and method according to the exemplary aspects of the present invention;

FIG. 7 illustrates a magnetic data storage diskette 700 to store the method 100;

FIG. 9 illustrates a conventional list 900;

FIG. 10 illustrates a conventional mind map 1000 of list 900;

DETAILED DESCRIPTION OF THE EXEMPLARY EMBODIMENTS OF THE INVENTION

Figure 1:
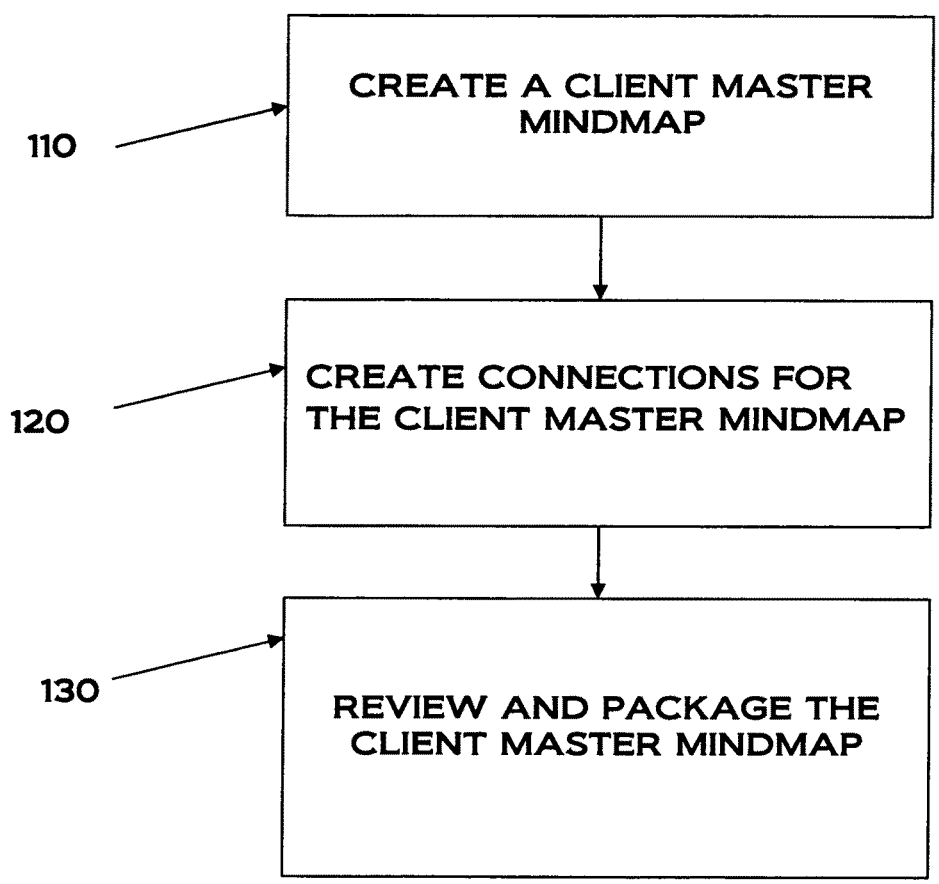
FIG. 1 illustrates an exemplary method 100 for creating mind maps, according to an exemplary aspect of the present invention.

Referring now to the drawings, and more particularly to FIGS. 1-7 and 12-22, there are shown exemplary embodiments of the method and structures according to the present invention.

FIG. 1 illustrates a method 100 for creating mind maps and crafting a front facing information for clients and customers. The method may include three phases. Referring to FIG. 1, in a first phase (Step) 110, a client master mind map is created. Next, in a second phase (Step) 120, connections are created between the client master mind map and the client's actions and activities. Subsequently and periodically, in third phase (Step) 130, revision and packaging of the client master mind map are performed.

First Phase

Figure 2:
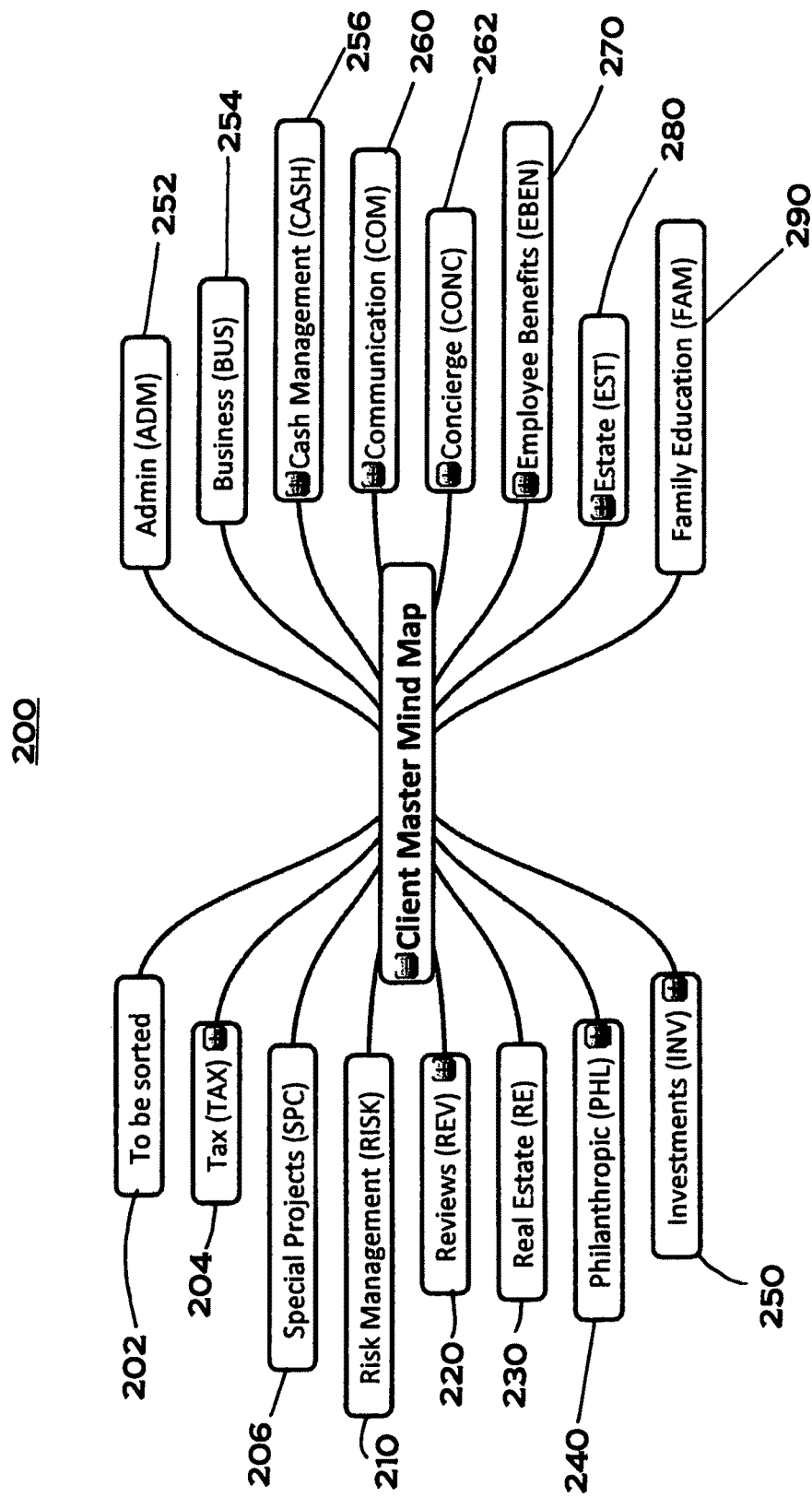
FIG. 2 illustrates an exemplary template 200 for creating a client master mind map for financial service organizations, according to an exemplary aspect of the present invention.

In a first phase 110, a client master mind map is created (i.e., generated) for a client. For example, FIG. 2 illustrates an exemplary client master mind map for a financial services organization 200 that may be generated in the first phase 110. That is, client master mind map 200 exemplarily organizes, in a front-facing manner (e.g., prepared directly for a client to implement, view, or use), items to be sorted 202, tax issues 204, special projects 206, risk management information 210, Reviews 220, Real Estate information 230, philanthropic activity information 240, information concerning investments 250, administrative information 252, business information 254, cash management information 256, communication activities 260, concierge information 262, employee benefits 270, client estate information 280, and family educational information 290. Of course, other template information can be provided for a particular client's needs and information. That is, the inventor has determined that a mind map exemplarily containing some or all of these fields would enable front-facing communication and use of client master mind maps for clients.

Second Phase

Figure 3:
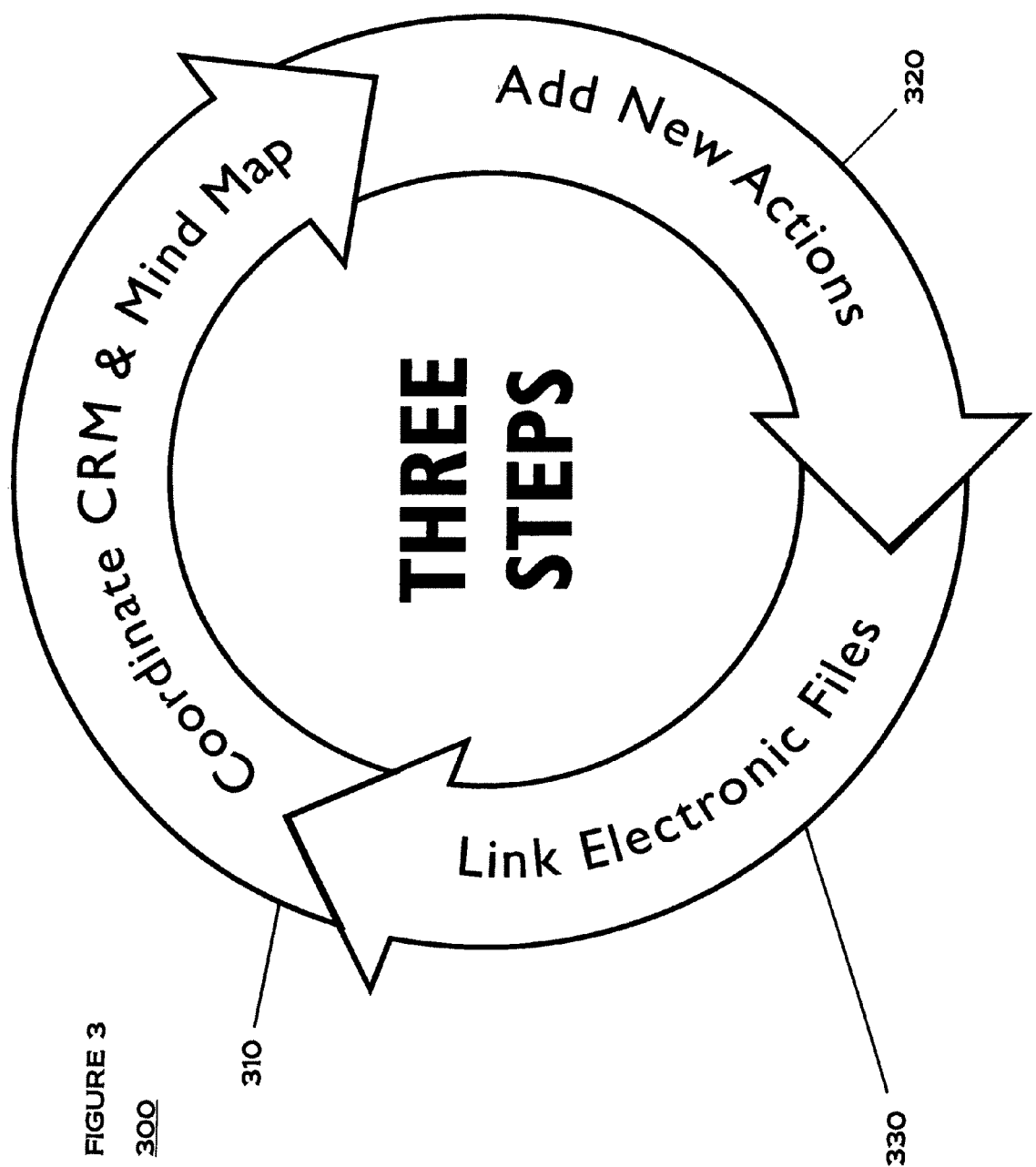
FIG. 3 illustrates an exemplary method 300 for coordinating the mind map and a client relationship management program, according to an exemplary aspect of the present invention.

Referring to FIG. 3, an exemplary second phase 120 is illustrated. The second phase 120 may include three steps 310, 320, and 330. Referring to FIG. 3, a new client master mind map represents an exemplary structure of the client's estate. The second phase 130 would exemplarily connect (i.e., associate or link) together the structure of the client's estate with the client's actions. Exemplarily, a client relationship management (CRM) program, and a client documents (electronic or paper) are connected (i.e., associated or linked) together. Connecting together the client's estate with the client's actions would exemplarily allow advisors to easily access all client information in a form of actions/activities and client documents.

Step One—Coordinate CRM & Mind Map

First, in Step 310, whatever system that is being used to track the client's activities/actions should be integrated into the client master mind map. This integration may exemplarily take different forms depending on the CRM software that is being utilized.

In one example, consider the ease of communication in linking CRM actions to the client master mind map. Exemplarily, the most difficult form of communication happens when a client calls with an inquiry. The call was not anticipated, and thus no prior planning was completed by the firm. The client's inquiry involves something specific, related to one activity that may or may not have been previously handled by the team member filling the inquiry.

A typical staff response would be to call the client back after reviewing the inquiry and after finding an appropriate response or action. While these actions may not seem onerous, the time necessary to get back to the client can easily take around 15 to 30 minutes. Also, the particular staff member who fielded the call may not be able to "connect" the request, out of inexperience or lack of familiarity, with the client's estate. This, in turn, may require the person advising the client to become personally involved in the inquiry, thereby leading to frustration and inefficiency.

Connecting a client's query to a specific action immediately on the phone saves all of these time-consuming steps. When an action is easily picked out of fifteen to twenty other actions, for example, then that action may quickly be addressed. If a staff member is unfamiliar with a client's estate, then the individual can exemplarily open the client master mind map to determine how the specific query and action are tied into the mind map branch at issue. The query can therefore be answered at the staff level without bringing the advisor into the picture.

Step Two—Add New Actions

In Step 320, the client master mind map is exemplarily built from a list of all items related to a client. There will be many new action items to be added to that CRM. Exemplarily, a thorough review of all clients will result in many new items that were initially unidentified. These items generally surface because of the greater clarity that result from building the client master mind map, while adding new actions and then linking the new actions to the client master mind map.

Step Three—Link Electronic Files

In Step 330, the client's electronic files are linked with respective portions of the client master mind map. Accordingly, with respect to the exemplary client phone query, not only do inquiries require actions to be reviewed, these inquiries almost always require a review of related documents. If these documents are in electronic files, then all major documents should exemplarily be linked to the client master mind map.

Depending on the CRM program, documents may also be linked to individual actions. Most mind-mapping software exemplarily allows for the attachment of electronic files, word processing files, spreadsheets and other program files. However, linking the major investment, estate, tax, business and cash flow documents can also be very helpful in retrieval and understanding. Once files have been linked to the client master mind map and/or CRM activities, then all connections have been made to efficiently and effectively service clients.

Third Phase

Step One—Review Client Master Mind Map

Figure 4:
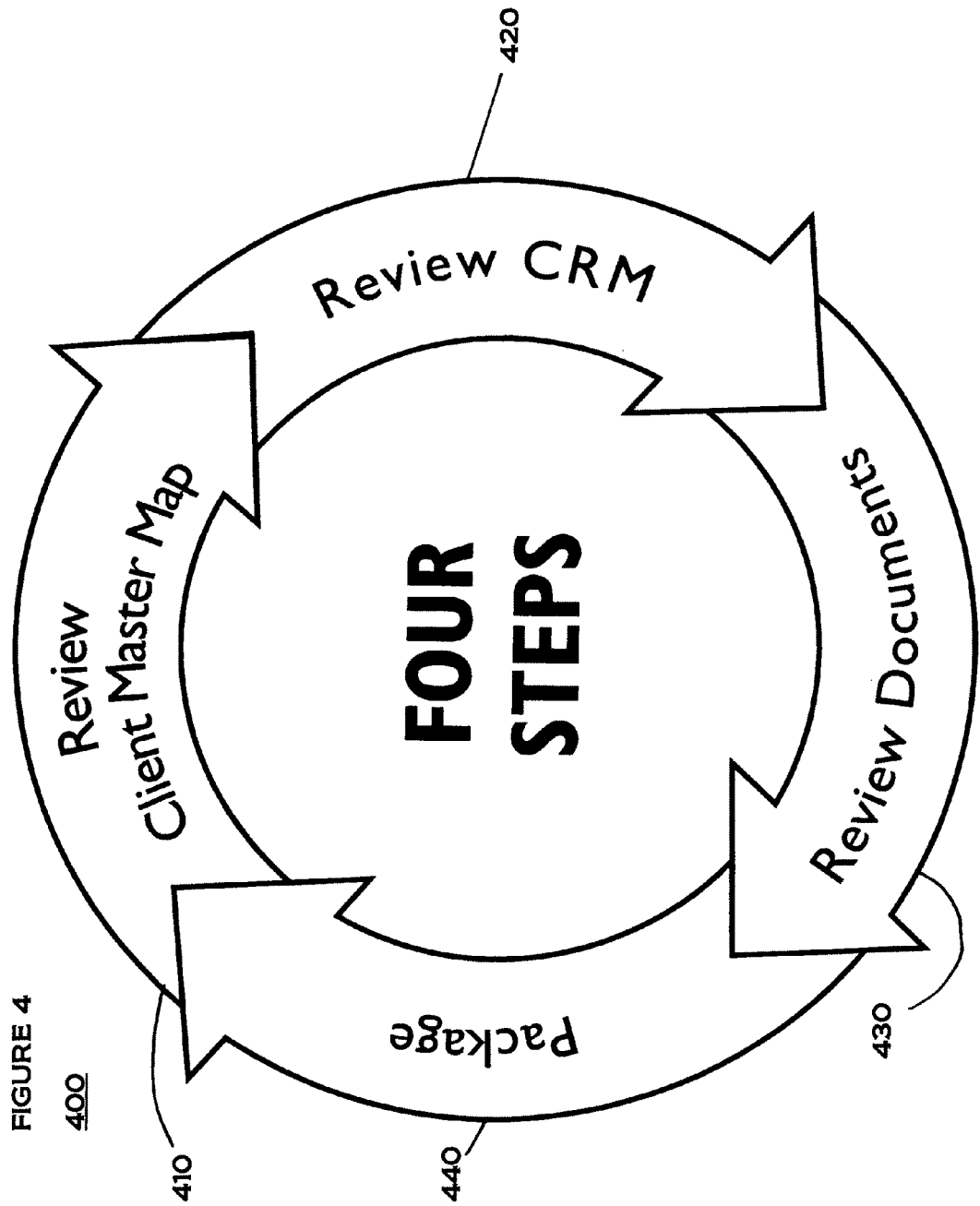
FIG. 4 illustrates an exemplary method 400 for reviewing the mind map and the client relationship management program, according to an exemplary aspect of the present invention.

FIG. 4 illustrates an exemplary third phase 130 of the method 100, for reviewing the client's information. The third phase 130 may include four steps 410, 420, 430, and 440. Referring to FIG. 4, the review process exemplarily starts with scheduling a client for a formal/informal review in person or on a teleconference or webinar. Conventionally, it would take 15 minutes to a full hour to get one's "arms around" (e.g., understand) a current client situation. Files would be gathered, notes and actions retrieved, along with correspondence and e-mails. That is, in Step 410, the client master mind map is reviewed.

Step Two—Review CRM Actions

In Step 420, the CRM is reviewed. With the client master mind map on one monitor (e.g., display) and actions on another monitor, a complete review may be accomplished in less than half the time. As each action is reviewed, a document is immediately accessible for review and the agenda is built. Each action is linked to each client master mind map branch. Of course, each item on a branch may not have an action. Reviewing the CRM actions in tandem with the client master mind map allows the team to quickly and thoroughly update the client's current situation.

Step Three—Review Documents

Exemplarily, in Step 430, documents will be reviewed. Exemplarily, there may be some documents that are frequently covered during client reviews. The most recent document should exemplarily be updated, linked, and reviewed. Documents should be easily accessible if electronically filed. At a minimum, the standardized word processing, portfolio management reports and spreadsheets may be reviewed/updated and attached to the client master mind map.

Step Four—Package

Exemplarily, in Step 440, the client master mind map is packaged and presented to the client. Typically, great packaging provides a better experience, especially when it is substantive and not just marketing. Clients typically understand "their stuff" if it is packaged well. Exemplarily, the client master mind map provides packaging for a new and expanded service experience. The inventor discovered that clients prefer to have a hard copy of their mind map on hand at their home. Accordingly, another exemplary step is to display (e.g., print or provide other visualization) these mind maps for the client. Exemplarily, the present invention may provide mind-mapping software that provides a client reader version that is downloadable by the clients to view their mind maps on their personal computer.

Figure 5A:
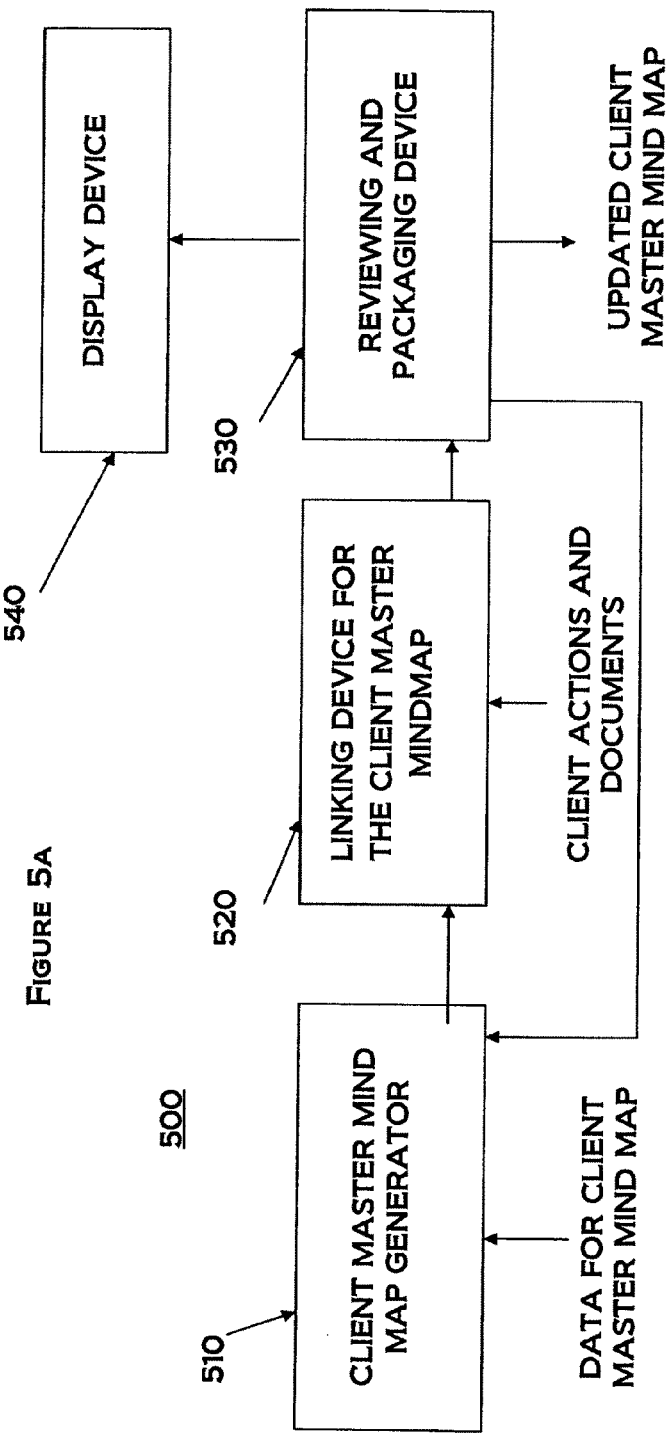
FIGS. 5A and 5B illustrate an exemplary system 500 for creating mind maps, according to an exemplary aspect of the present invention.

FIG. 5A illustrates an exemplary system 500, according to an exemplary aspect of the present invention for exemplarily performing the method 100. Referring to FIG. 5A, there is first provided a mind map Generator 510 configured to create a client master mind map from client data for the mind map. Exemplarily, a linking device 520 is provided that performs a linking function between the client's data, including actions and documents. The linking device 520 may be implemented, for example, by a processor (e.g., a computer system including a processor). In addition, there is provided a client master mind map reviewing and packaging device 530 that is configured to perform a review of the client's master mind map. Furthermore, display device 540 may be provided to exemplarily display, print out, or otherwise share the client master mind map. Further, as illustrated in FIG. 5A, the updated client master mind map may be fed back into the mind map Generator 510 in order to update the mind map.

Figure 5B:
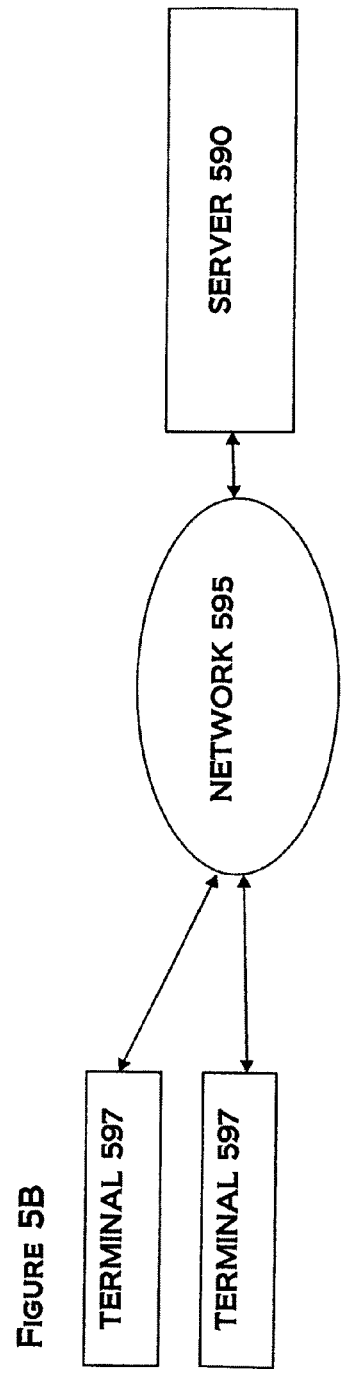
Figure 8:
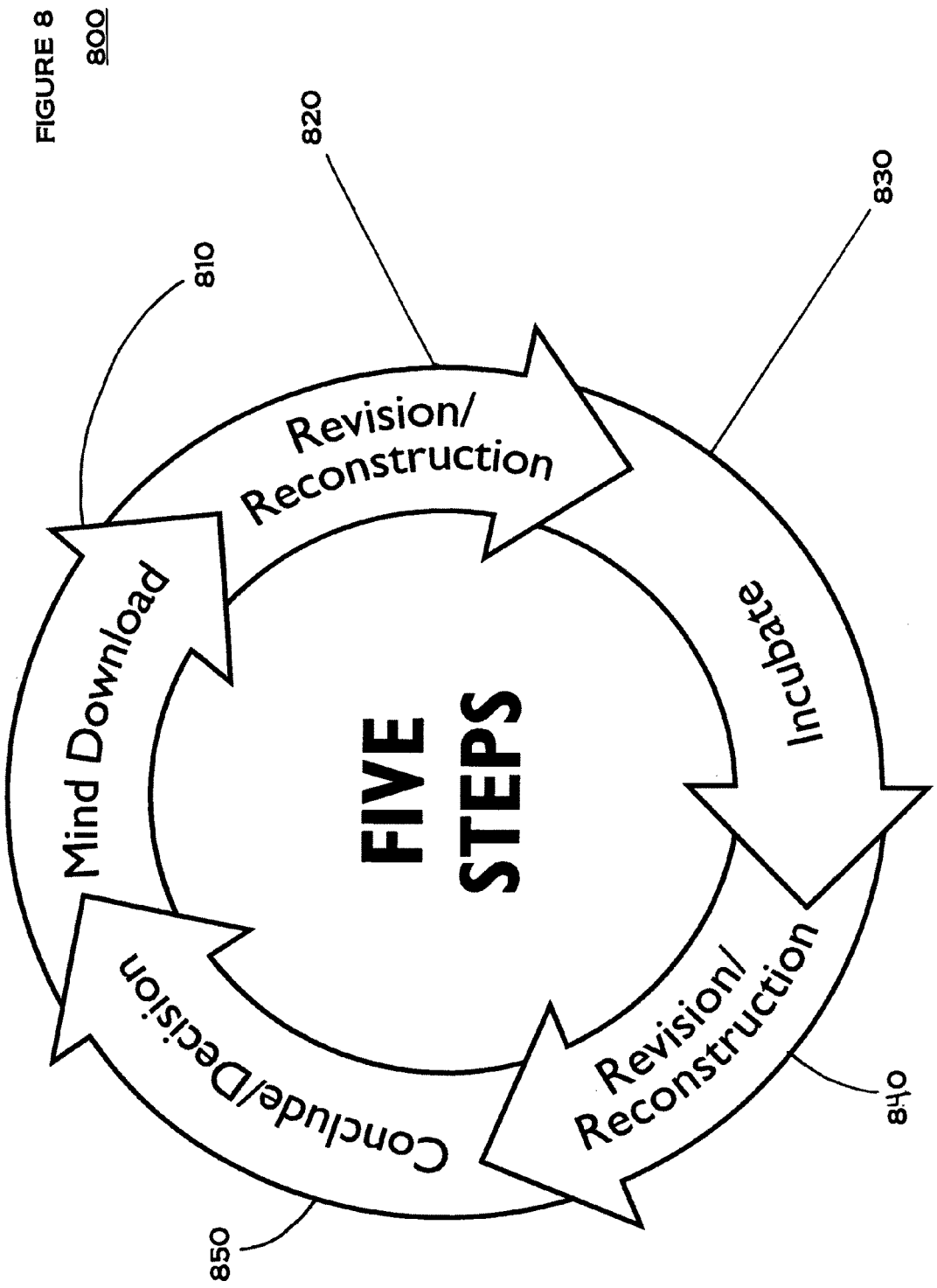
FIG. 8 illustrates a conventional method 800 for creating a mind map.
Figure 11:
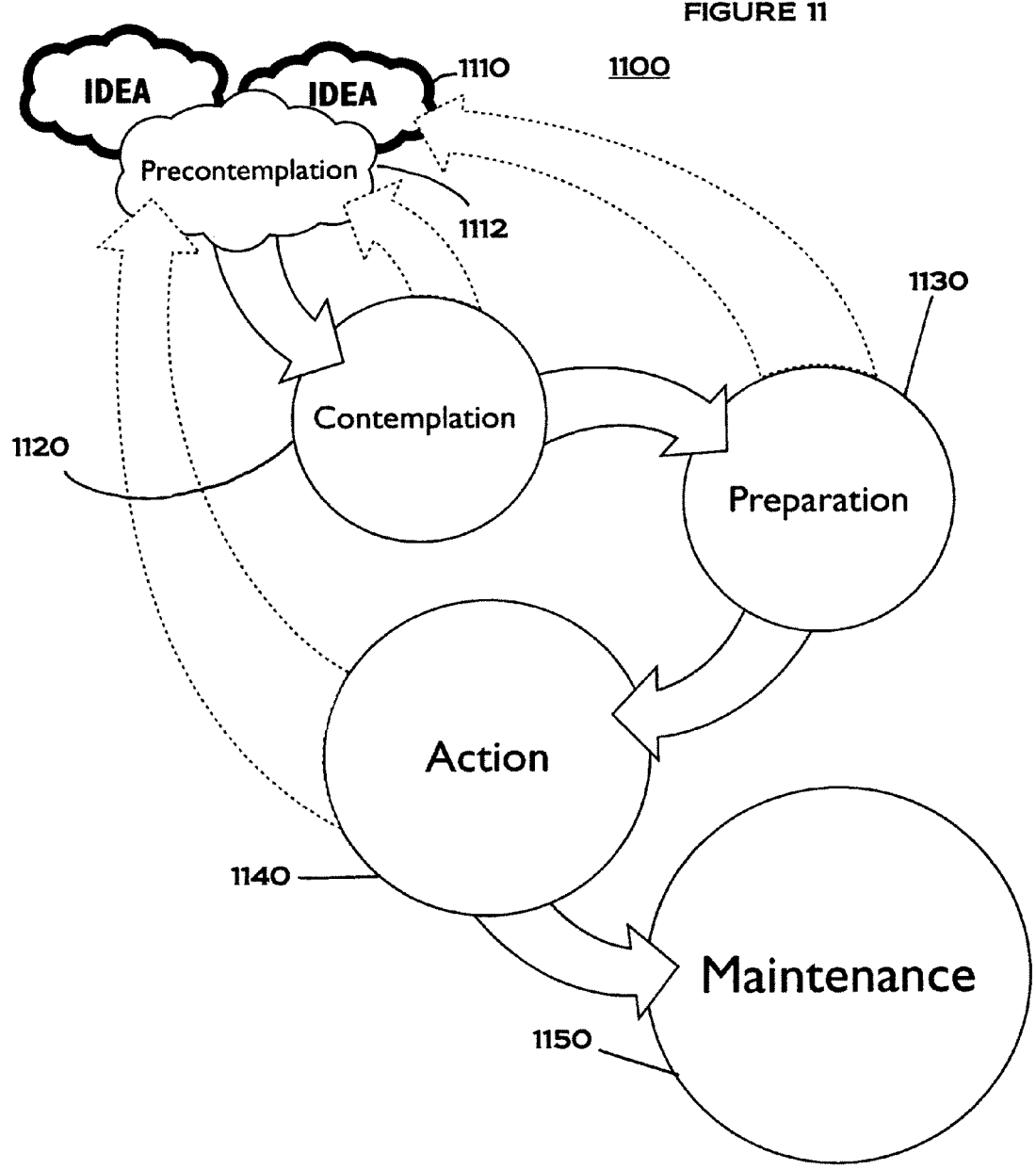
FIG. 11 illustrates a conventional Transtheoretical Model of Behavior model 1100.

Further, the system 500 may be partly software implemented as stored on a server 590 which is connected to a network 595 with a plurality of user terminals 597, as exemplarily illustrated in FIG. 5B.

In particular, as illustrated in FIG. 5A, the system 500 for linking a client action to an action or document may generate a display screen (e.g., a graphic user interface (GUI)) on the display 540 to display template 200 of FIG. 2. That is, FIG. 2 can also exemplarily illustrate a display screen generated by the system 500 and be displayed on display device 540 (e.g., on a display device of a user terminal 597 which is connected to network 595, as illustrated in FIG. 5B).

Referring now to FIG. 6, system 600 illustrates a typical hardware configuration which may be used for implementing the inventive system and method for creating front facing mind maps for communication to clients and customers (e.g., see FIGS. 1-5B and 12-22). The configuration has preferably at least one processor or central processing unit (CPU) 610. The CPUs 610 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, and Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 610 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 610 and hardware above, to perform the method of the invention.

This signal-bearing media may include, for example, a RAM contained within the CPU 610, as represented by the fast-access storage for example. Alternatively, the instructions may be contained in another signal-bearing media, such as a magnetic data storage diskette 700 or CD-ROM 602, (FIG. 7), directly or indirectly accessible by the CPU 610.

Whether contained in the computer server/CPU 610, or elsewhere (e.g., a remote server or network), the instructions may be stored on a variety of tangible, non-transitory machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

Accordingly, the present invention provides additional value through the client master mind map, it is important to address being compensated for this value-added service. As a result, clients are no longer receiving "shadow work" services for free.

Behavior-Assets-Under-Management (AUM)

In charging fees, there is a behavioral pattern that has been set into action. The Precontemplation and Contemplation occurs when one considers a new client for a particular firm's platform. Contemplation leads to a new prospect under consideration.

Figure 12:
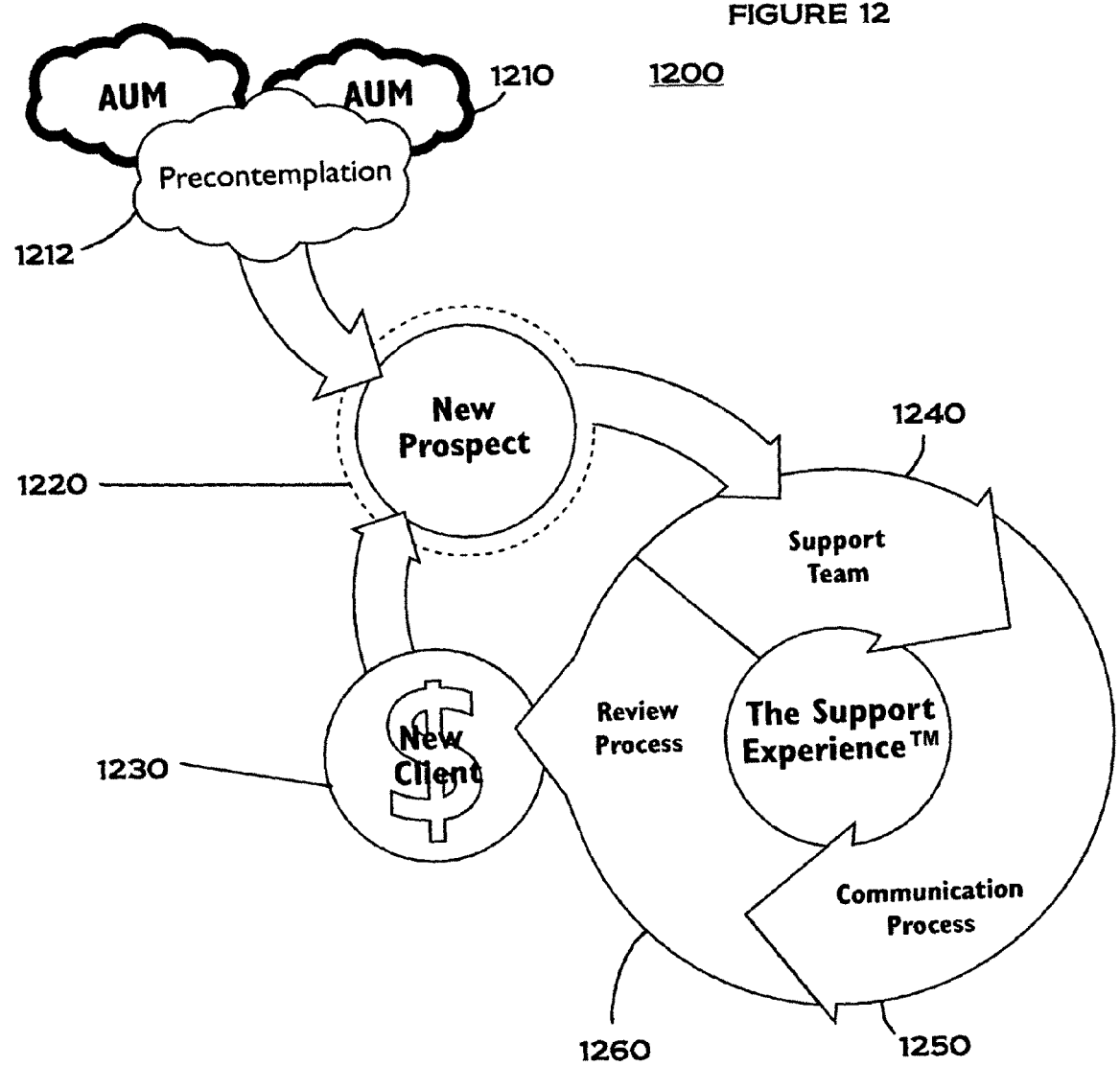
FIG. 12 illustrates an exemplary Behavior-Assets-Under-Management model 1200, according to an exemplary aspect of the present invention.

Preparation and Action occur upon taking on this new client and integrating this individual into a firm's service offering. Maintenance may be in the form of new money received from a new client and recurring revenue from the client. FIG. 12 illustrates a convention Behavior-Assets-Under-Management model 1200. This may function well until the firm offers additional services to its existing and new clients. Thus, referring to FIG. 12, assets under management 1210 undergo a support experience which includes a Support Team Staff 1240 primarily responsible for supporting client's needs and integrating new capability. A Communication Process 1250 includes integrated communication between and among staff and clients, and a review process 1260 also is provided.

Behavior-Value-Added Services

Conventionally, advisors will enter data into a spread sheet, review the current allocations, and make recommendations to their client. Suppose the advisor has a background in estate planning; and an annual review of a client's estate was offered and was integrated into the re-allocation service. The assumptions above make clear that all of this was done without charging a fee.

Conventionally, however, no automatic Maintenance mechanism is in place to receive value in return for the services provided to that client. The traditional assets-under-management model is operating and advisors are finding that they are delivering more and more "shadow work." The assets-under-management model conventionally fails to support this kind of behavior.

Behavior-Assets-Under-Management (AUM) and Value-Added Services

Under the AUM behavioral model, there is virtually no preparation or behavioral change. This model becomes "automatic." Each new prospect is implemented into the firm's platform, and then ongoing advice and review follow.

By contrast, value-added services require periodic behavioral changes as new offerings are contemplated, prepared and then implemented. The mechanical piece during the Maintenance phase is additional revenue received from the client (which is not related to the AUM fee). This additional revenue may be in the form of hourly fees or quarterly retainers or project fees. To be sure, hourly fees and project fees are difficult to scale and require repeated selling to clients.

FIGS. 13-22 illustrate exemplary embodiments of the present invention, as a client master mind map is exemplarily front-facing for a client. For example, exemplary tools for carrying out the invention are illustrated where a client's actions and documents are quickly reviewed in a front-facing manner.

In particular, as illustrated in FIG. 5A, the system 500 for linking a client action to an action or document may generate a display screen (e.g., a graphic user interface (GUI)) on the display 540.

Figure 13:
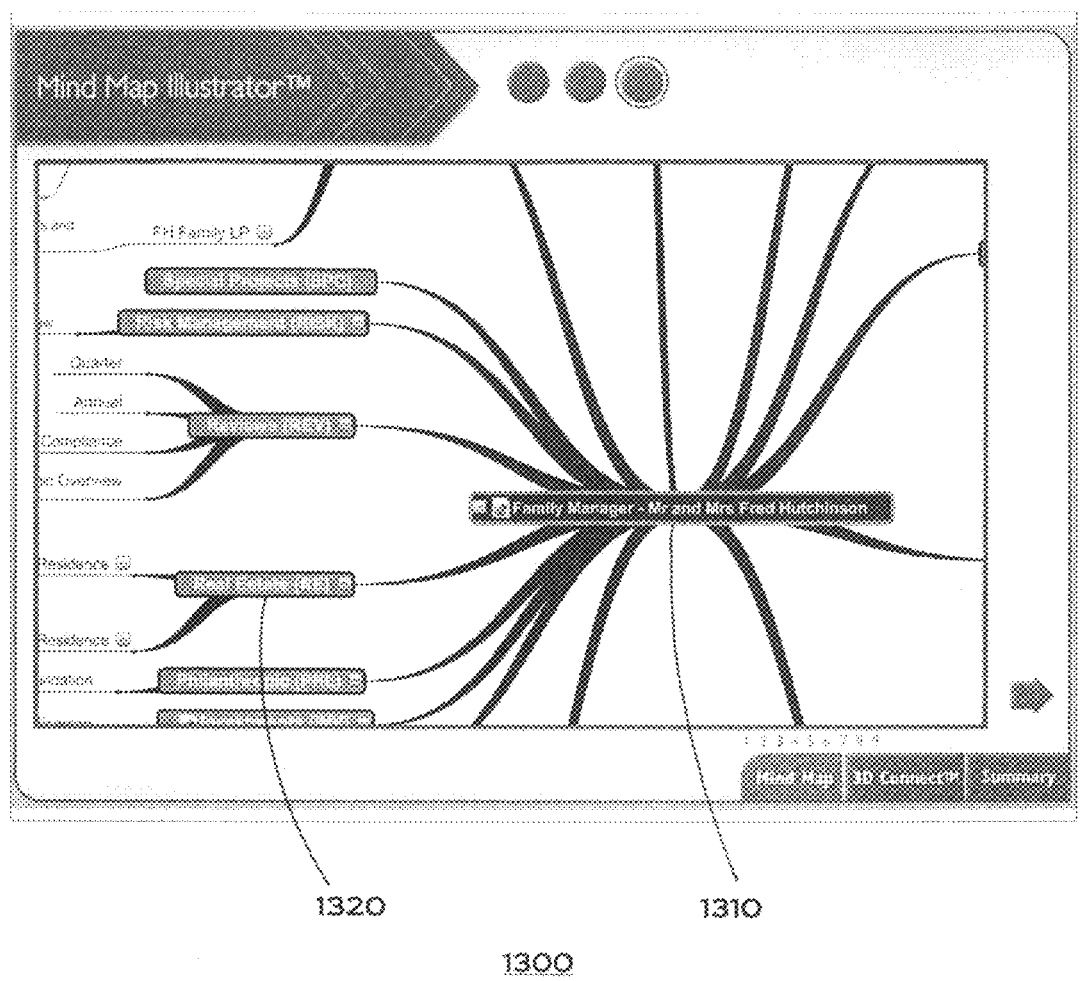
FIGS. 13-22 illustrate exemplary embodiments of the present invention, as a client master mind map is exemplarily front-facing for a client.

FIG. 13 illustrates an exemplary display screen 1300 which may be generated by the system 500 and be displayed on display device 540 (e.g., on a display device of a user terminal 597 which is connected to network 595, as illustrated in FIG. 5B). Furthermore, display 1300 displays elements of a client master mind map created according to the template 200 of FIG. 2. Thus, FIG. 13 illustrates the linking of a family manager 1310 for a client and various elements of template 200. For example, real estate information 1320 is illustrated as being linked to the family manager 1310.

Figure 14:
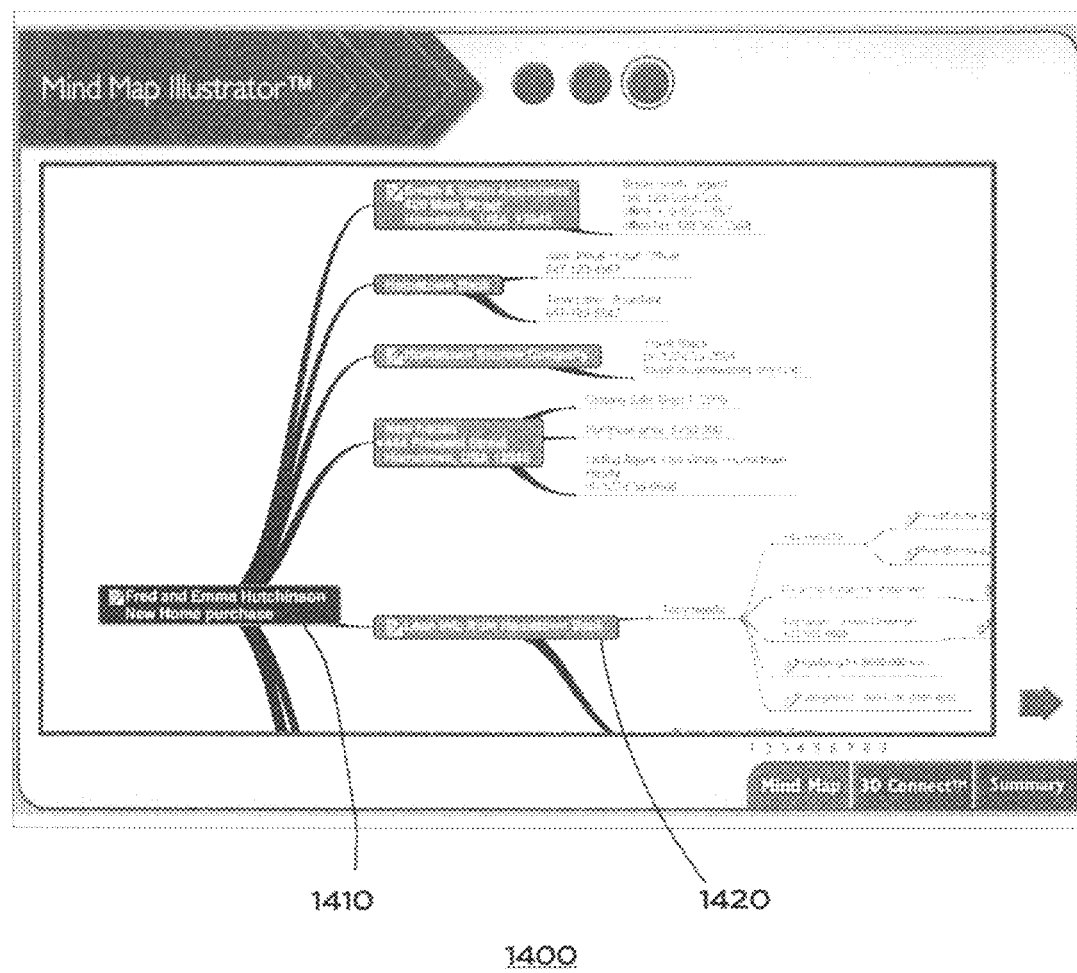

FIG. 14 illustrates an exemplary display screen 1400 which may be generated by the system 500 and be displayed on display device 540 (e.g., on a display device of a user terminal 597 which is connected to network 595, as illustrated in FIG. 5B). Furthermore, display 1400 displays elements of the client master mind map created according to the template 200 of FIG. 2. Thus, FIG. 14 illustrates the linking of a family home purchase 1410 for the client and a link thereof to documents such as loan information 1420.

Figure 15:
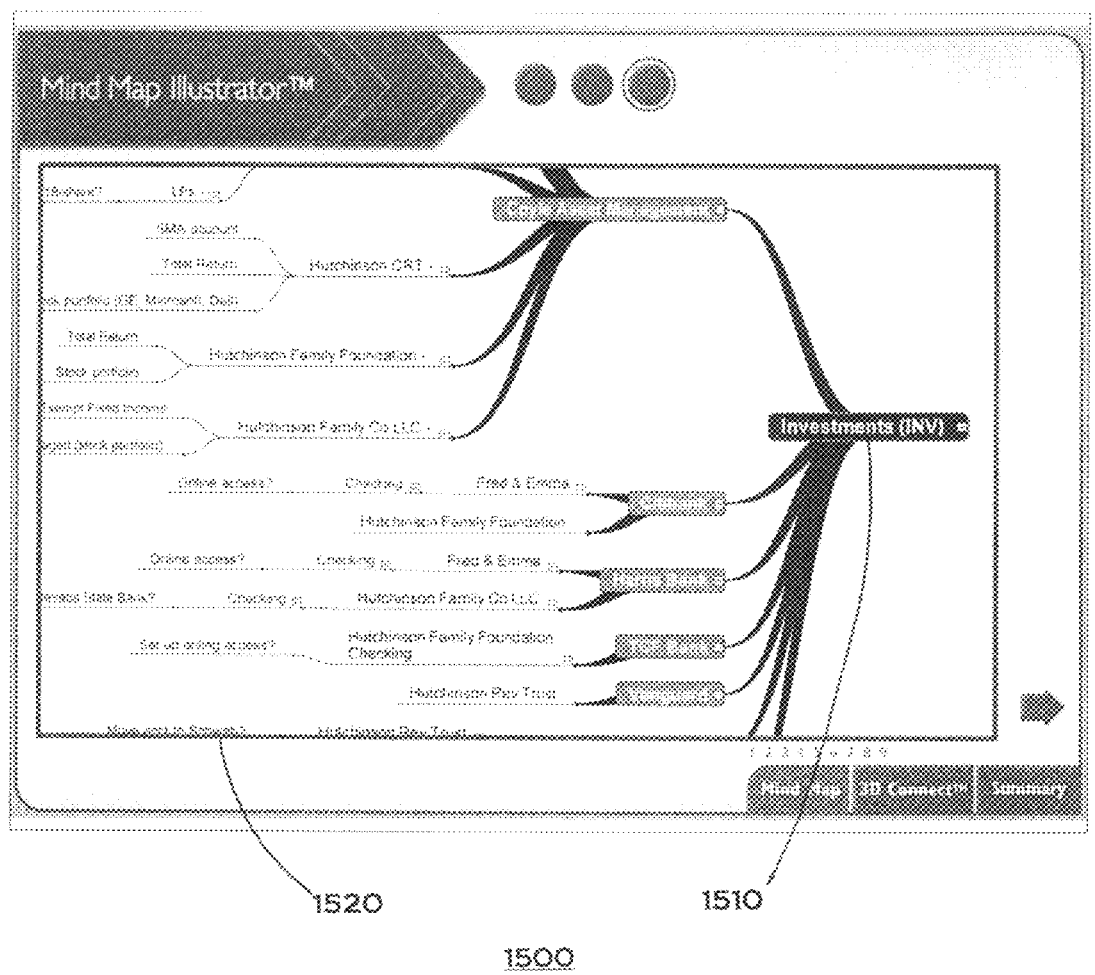

FIG. 15 illustrates an exemplary display screen 1500 which may be generated by the system 500 and be displayed on display device 540 (e.g., on a display device of a user terminal 597 which is connected to network 595, as illustrated in FIG. 5B). Furthermore, display 1500 displays elements of the client master mind map created according to the template 200 of FIG. 2. For example, FIG. 15 illustrates the linking of the client's investments 1510 for the client and a link thereof to an action such as changing banks 1520.

Figure 16:
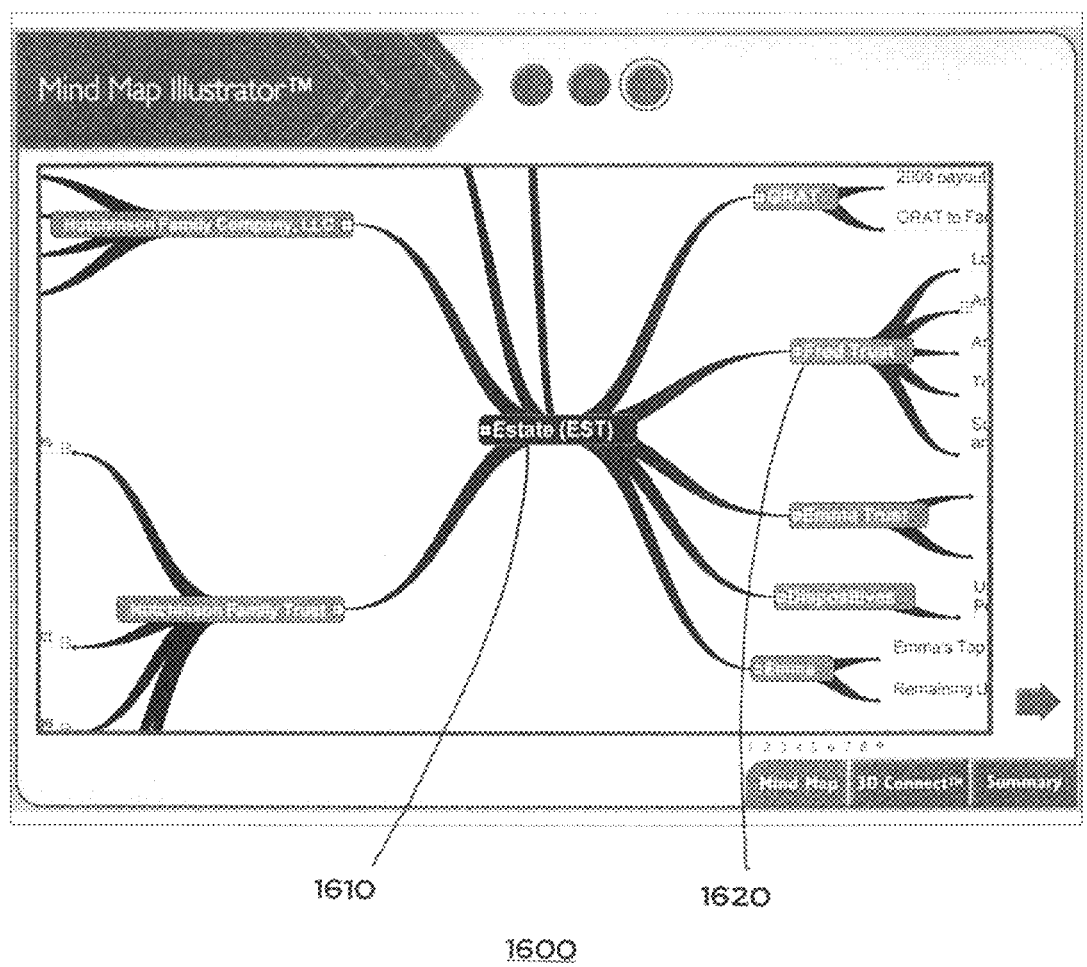

FIG. 16 illustrates an exemplary display screen 1600 which may be generated by the system 500 and be displayed on display device 540 (e.g., on a display device of a user terminal 597 which is connected to network 595, as illustrated in FIG. 5B). Furthermore, display 1600 displays elements of the client master mind map created according to the template 200 of FIG. 2. For example, FIG. 16 illustrates the linking of the client's estate 1610 for the client and a link thereof to an action such as gifts 1620.

Figure 17:
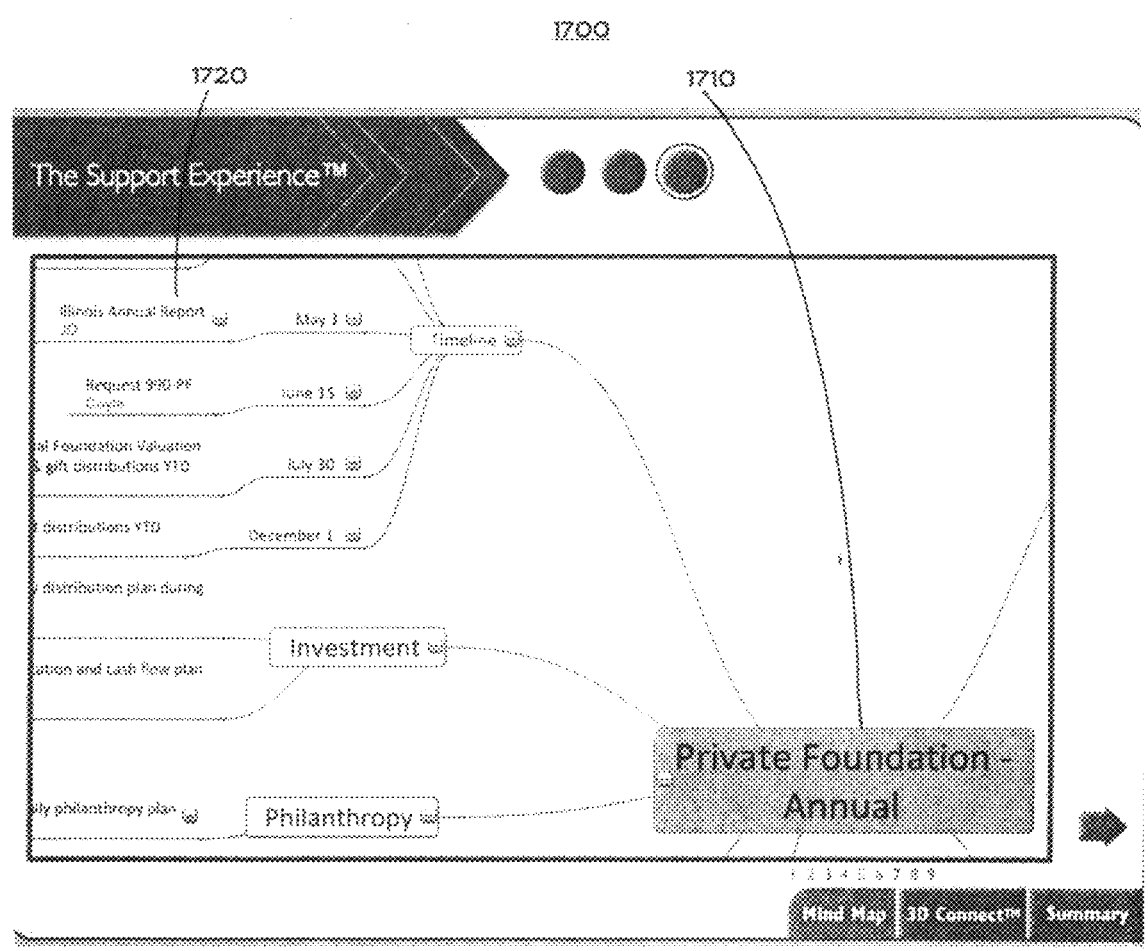

FIG. 17 illustrates an exemplary display screen 1700 which may be generated by the system 500 and be displayed on display device 540 (e.g., on a display device of a user terminal 597 which is connected to network 595, as illustrated in FIG. 5B). Furthermore, display 1700 displays elements of the client master mind map created according to the template 200 of FIG. 2. For example, FIG. 17 illustrates the linking of the private foundation 1710 for the client and a link thereof to the client documents such as a report 1720.

Figure 18:
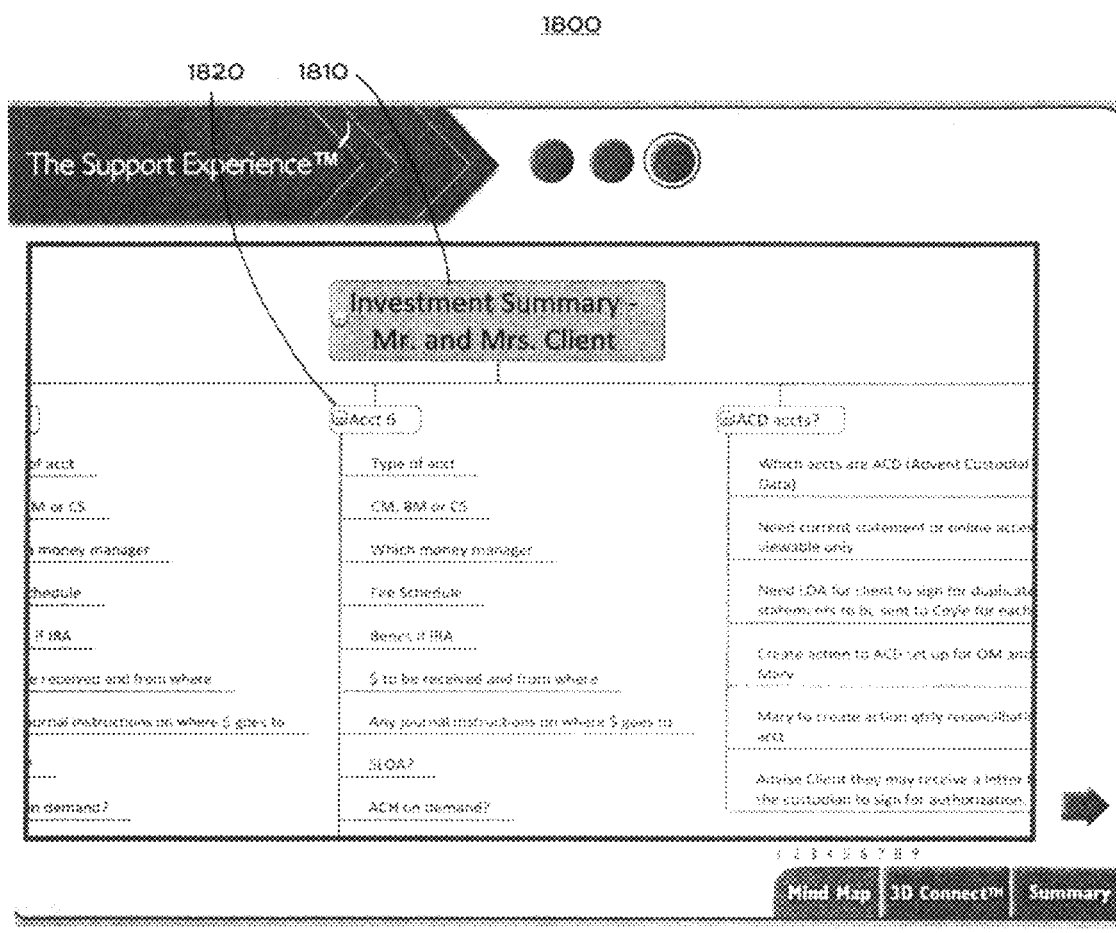

FIG. 18 illustrates an exemplary display screen 1800 which may be generated by the system 500 and be displayed on display device 540 (e.g., on a display device of a user terminal 597 which is connected to network 595, as illustrated in FIG. 5B). Furthermore, display 1800 displays elements of the client master mind map created according to the template 200 of FIG. 2. For example, FIG. 18 illustrates the linking of the investment summary 1810 for the client and a link thereof to the client's accounts such as Account 6 1820.

Figure 19:
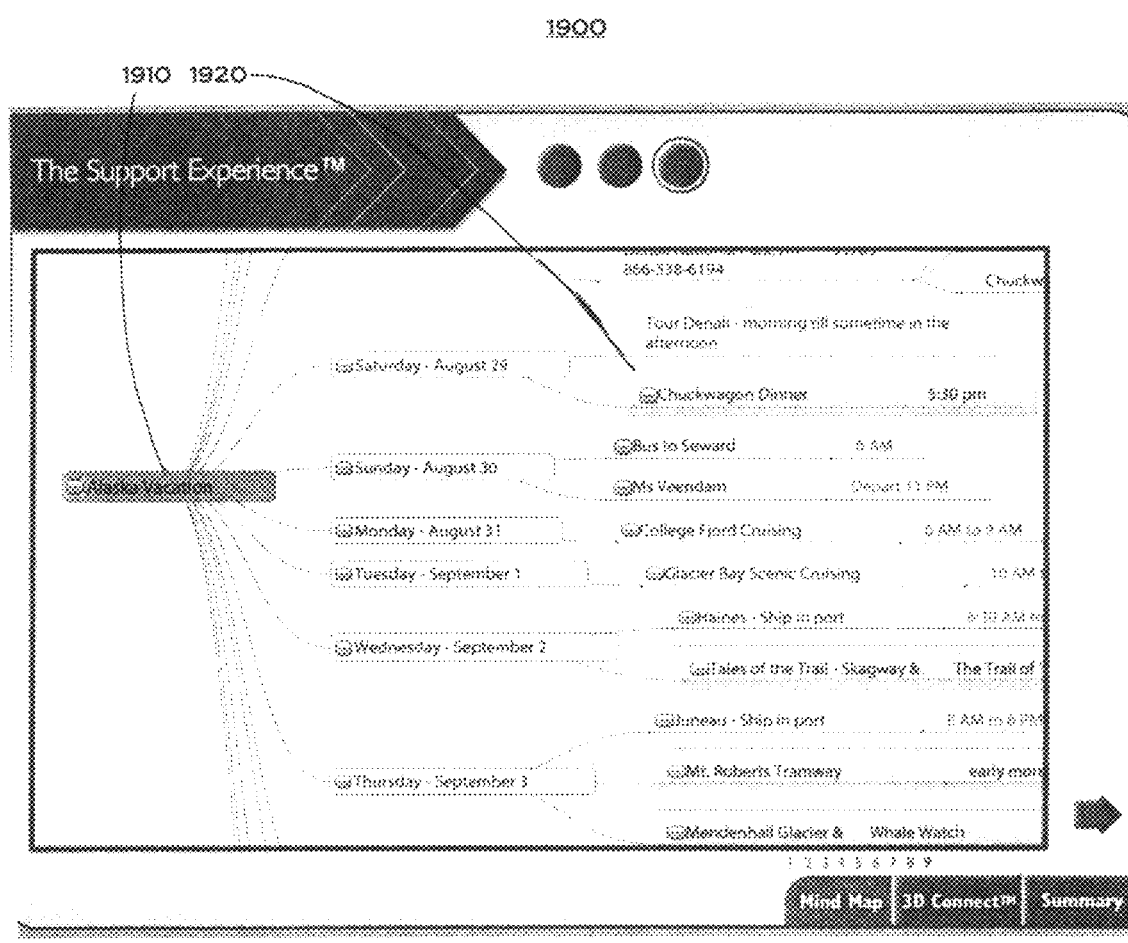

FIG. 19 illustrates an exemplary display screen 1900 which may be generated by the system 500 and be displayed on display device 540 (e.g., on a display device of a user terminal 597 which is connected to network 595, as illustrated in FIG. 5B). Furthermore, display 1900 displays elements of the client master mind map created according to the template 200 of FIG. 2. For example, FIG. 19 illustrates the linking of the client's vacation plans 1910 for the client and a link thereof to the client's travel information such as a dinner reservation 1920.

Figure 20:
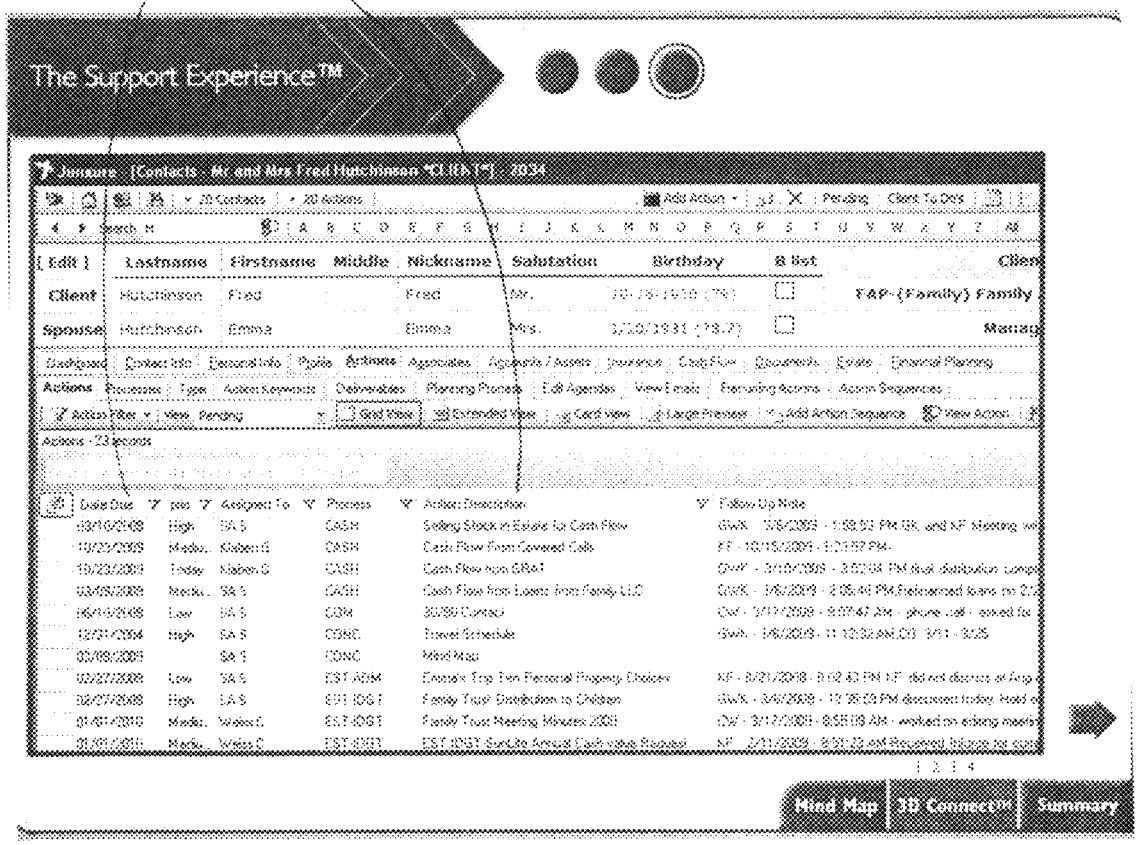

FIG. 20 illustrates an exemplary display screen 2000 which may be generated by the system 500 and be displayed on display device 540 (e.g., on a display device of a user terminal 597 which is connected to network 595, as illustrated in FIG. 5B). Furthermore, display 2000 displays a CRM that is linked to the client's master mind map as illustrated in FIGS. 13-19. For example, FIG. 20 illustrates the action items on an exemplary client action page for the client, such as due dates 2010 and action descriptions 2020, and the like. Exemplarily, these actions can be linked to and explored from the associated client master mind map.

Figure 21:
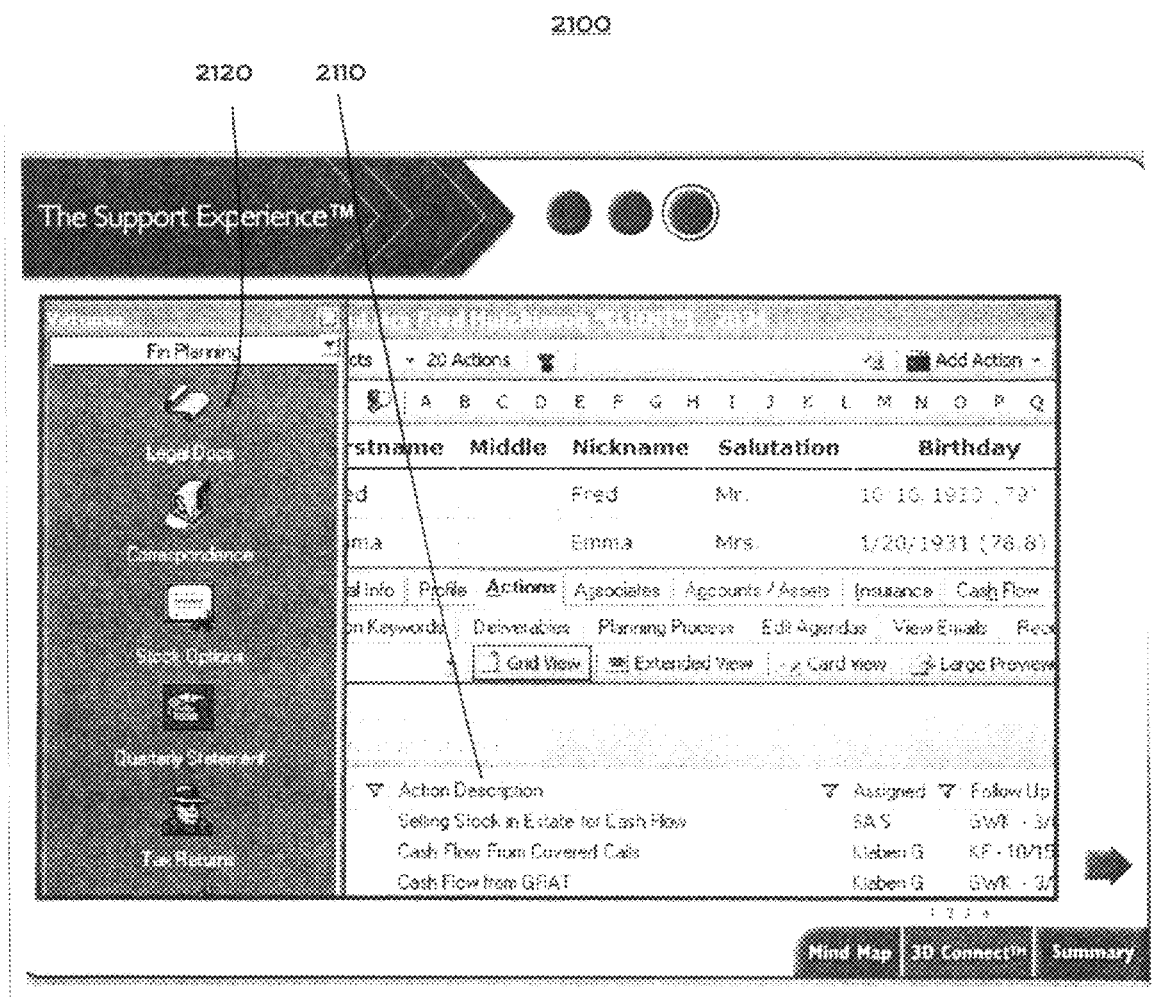

FIG. 21 illustrates an exemplary display screen 2100 which may be generated by the system 500 and be displayed on display device 540 (e.g., on a display device of a user terminal 597 which is connected to network 595, as illustrated in FIG. 5B). Furthermore, display 2100 displays a document management system that is linked to the client's master mind map as illustrated in FIGS. 13-19. For example, FIG. 21 illustrates the action items on an exemplary client action page for the client, such as action descriptions 2010. Furthermore, short-cuts such as a short-cut to legal documents 2020 are exemplarily provided which would allow for pointed navigation throughout the client's master mind map. Exemplarily, these documents can be linked to and explored from the associated client master mind map.

Figure 22:
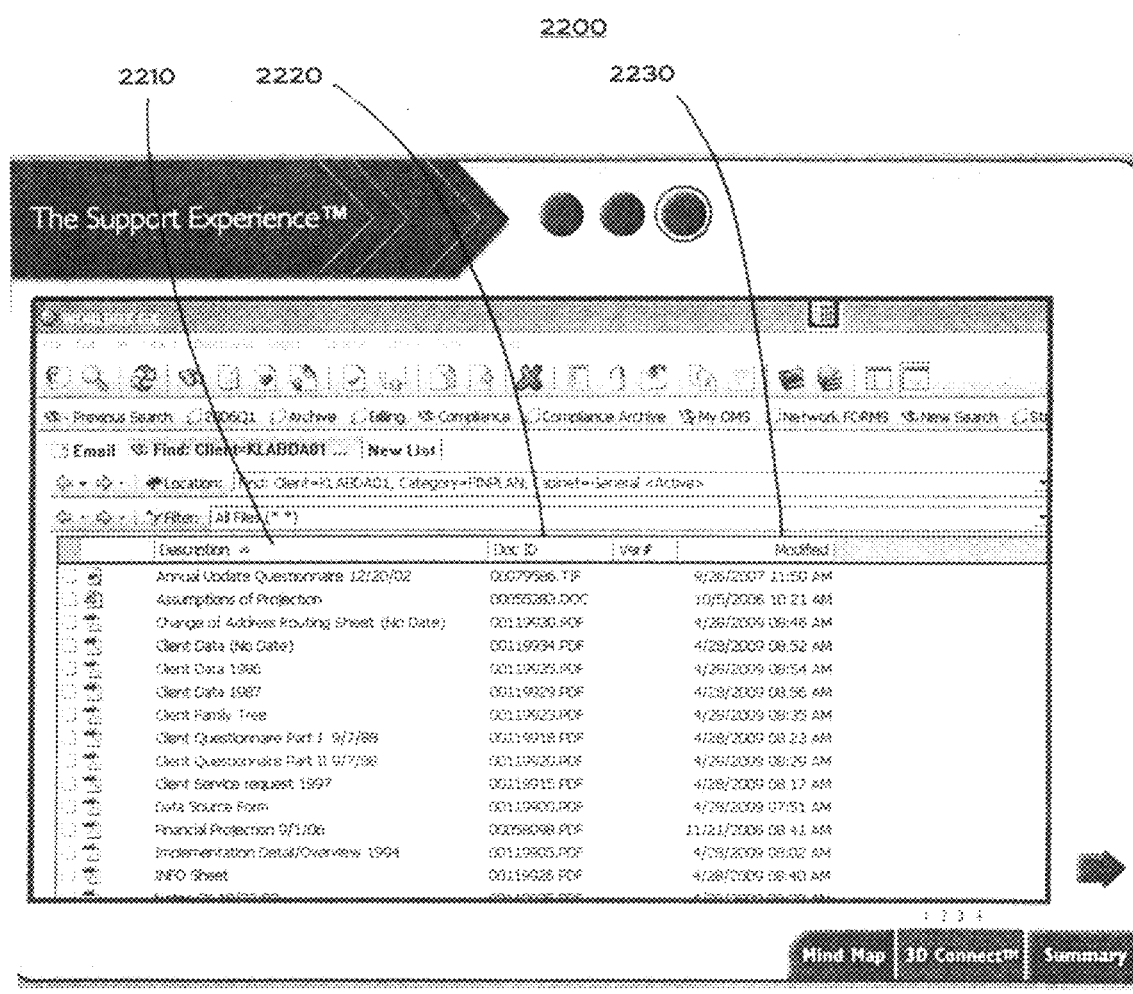

FIG. 22 illustrates an exemplary display screen 2200 which may be generated by the system 500 and be displayed on display device 540 (e.g., on a display device of a user terminal 597 which is connected to network 595, as illustrated in FIG. 5B). Furthermore, display 2200 displays a list of documents 2210 that are linked to the client's master mind map as illustrated in FIGS. 13-19. Thus, documents 2210 are described along with associated document identification 2220 and modification dates 2230.

The present invention thus provides an exemplary method of linking client actions and documents to a client master mind map to simplify a complex client business environment thereby providing front-facing master client mind maps for the customer.

In addition, the present invention may help prevent businesses from performing unpaid shadow work for their clients. That is, work can be properly billed to the client as it is performed.

Previously, company staffs and advisors did the best they could to help prepare, for example, for a financial review involving a client. The client master mind map review centers the team on the current structure of the client's estate and its relationship to individual actions/activities. The present invention exemplarily greatly reduces the amount of time required to review a client's or customer's structure, situation, actions, and documents.

While the invention has been described in terms of exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

Having thus described my invention, what I claim as new and desire to secure by Letters Patent is as follows:

1. A method of generating a linked client master mind map, the method comprising:
  linking client actions of a client of a financial services organization and client documents of the client of the financial services organization to a client master mind map to generate a linked client master mind map for use by the client, said linked client master mind map comprising a connected set of lists that are arranged radiantly and horizontally, the linking of the client actions and the client documents to the client master mind map comprising:
    integrating the client master mind map with a client relationship management (CRM) program which is used to track the client actions, such that the client actions in the CRM program are linked to a branch of the client master mind map; and
    linking the client master mind map with electronic files comprising the client documents;
  reviewing with the client:
    said linked client master mind map;
    the client actions in the CRM program; and
    the client documents;
  revising the linked client master mind map based on the reviewing with the client of the linked client master mind map, the client actions in the CRM program and the client documents;
  generating on a server of the financial services organization a graphical user interface (GUI) comprising a visual representation of the revised linked client master mind map for use by the client;
  displaying the visual representation of the revised linked client master mind map for the client on a display device of a user terminal of the client which is connected to the server by a network; and
  displaying a document management system screen that is linked to the client master mind map, the document management system screen displaying:
    information of the CRM program including a list of the client actions; and
    short-cuts to the client documents which are linked to the client master mind map,
  wherein the client actions in the CRM program comprise a client investment account for the client, and the client documents comprise documents related to the client investment account.

2. The method of claim 1, wherein said linking client actions and documents to the client master mind map comprises adding new actions to said client master mind map.

3. The method of claim 1, wherein said reviewing said linked client master mind map comprises packaging said client master mind map.

4. The method of claim 1, wherein said linked client master mind map comprises a front-facing linked client master mind map for the client.

5. A system configured to generate a linked client master mind map, the system comprising:
  a linking device configured to link client actions of a client of a financial services organization and client documents of the client of the financial services organization to a client master mind map to generate a linked client master mind map for use by the client, said linked client master mind map comprising a connected set of lists that are arranged radiantly and horizontally, the linking device being configured to link the client actions and the client documents to the client master mind map by:
    integrating the client master mind map with a client relationship management (CRM) program which is used to track the client actions, such that the client actions in the CRM program are linked to a branch of the client master mind map; and
    linking the client master mind map with electronic files comprising the client documents;
  a reviewing device configured to:
    review with the client:
      said linked client master mind map;
      the client actions in the CRM program; and
      the client documents; and
    revise the linked client master mind map based on the review with the client of the linked client master mind map, the client actions in the CRM program and the client documents;
  a display generator configured to generate on a server of the financial services organization a graphical user interface (GUI) comprising a visual representation of the revised linked client master mind map for use by the client;
  a display device of a user terminal of the client which is connected to the server by a network, and displays:
    the visual representation of the revised linked client master mind map for the client; and
    a document management system screen that is linked to the client master mind map, the document management system screen displaying:
      information of the CRM program including a list of the client actions; and
      short-cuts to the client documents which are linked to the client master mind map, wherein the client actions in the CRM program comprise a client investment account, and the client documents comprise documents related to the client investment account.

6. A non-transitory computer-readable storage medium tangibly encoded with a program of machine-readable instructions executable by a digital processing apparatus to perform a computerized method of generating a linked client master mind map, the method comprising:
- linking client actions of a client of a financial services organization and client documents of the client of the financial services organization to a client master mind map to generate a linked client master mind map for use by the client, said linked client master mind map comprising a connected set of lists that are arranged radiantly and horizontally, the linking of the client actions and the client documents to the client master mind map comprising:
  - integrating the client master mind map with a client relationship management (CRM) program which is used to track the client actions, such that the client actions in the CRM program are linked to a branch of the client master mind map; and
  - linking the client master mind map with electronic files comprising the client documents;
- reviewing with the client:
  - said linked client master mind map;
  - the client actions in the CRM program; and
  - the client documents;
- revising the linked client master mind map based on the reviewing with the client of the linked client master mind map, the client actions in the CRM program and the client documents;
- generating on a server of the financial services organization a graphical user interface (GUI) comprising a visual representation of the revised linked client master mind map for use by the client;
- displaying the visual representation of the revised linked client master mind map for the client on a display device of a user terminal of the client which is connected to the server by a network; and
- displaying a document management system screen that is linked to the client master mind map, the document management system screen displaying:
  - information of the CRM program including a list of the client actions; and
  - short-cuts to the client documents which are linked to the client master mind map,
- wherein the client actions in the CRM program comprise a client investment account for the client, and the client documents comprise documents related to the client investment account.

7. The system of claim 5, wherein said linked client master mind map comprises a front-facing linked client master mind map for the client.

8. The non-transitory computer-readable storage medium of claim 6, wherein said linked client master mind map comprises a front-facing linked client master mind map for the client.

9. The method of claim 1, wherein said linking said client actions and said documents to the client master mind map comprises organizing said client actions and said documents to be front-facing for the client.

10. The method of claim 1, wherein the generating of the GUI comprises generating the GUI on a server and displaying the GUI on a display device of a user terminal which is connected to the server via a network.

11. The method of claim 1, wherein the visual representation of the mind map comprises an interactive visual representation of the mind map such that the client actions in the CRM program which are linked to the mind map are presented to the client and explorable by the client.

12. The method of claim 1, wherein the visual representation of the mind map comprises an interactive visual representation of the mind map such that the client documents which are linked to the mind map are presented to the client as links which are selectable by the client to explore the client documents.

13. The method of claim 1, wherein the client actions in the CRM program further comprise a client bank account, and the client documents further comprise documents related to the client bank account.

14. The method of claim 1, wherein the client actions in the CRM program further comprise client real estate, and the client documents further comprise documents related to the client real estate.

15. The method of claim 1, wherein the client actions in the CRM program further comprise a client bank account, client real estate, client tax issues, client risk management information, client administrative information and client cash management information, and the client documents further comprise documents related to the client bank account, the client real estate, the client tax issues, the client risk management information, the client administrative information and the client cash management information.

16. The method of claim 1, wherein the reviewing of the linked client master mind map, the client actions in the CRM program and the client documents, comprises reviewing the linked client master mind map, the client actions in the CRM program and the client documents together with the client.

17. The method of claim 1, wherein the reviewing of the linked client master mind map, the client actions in the CRM program and the client documents, comprises simultaneously reviewing a display of the linked client master mind map and a display of the client actions in the CRM program.

18. The method of claim 1, further comprising:
- displaying a client action page of the client from the CRM program that is integrated with the client master mind map, the CRM display screen displaying a list of the client actions and due dates associated with the client actions, and the client actions being linked to and explorable from the client master mind map.

19. The method of claim 1, further comprising:
- displaying a list of the client documents that are linked to the client master mind map, document identification associated with the client documents, and a modification dates associated with the client documents.

* * * * *